Feb. 21, 1961     M. WALTER     2,972,265
DIFFERENTIAL MECHANISM FOR MOTOR VEHICLES
Filed April 23, 1958     2 Sheets-Sheet 1

INVENTOR.
MAURICE WALTER
BY
Paul M. Phillips
ATTORNEY

Feb. 21, 1961    M. WALTER    2,972,265
DIFFERENTIAL MECHANISM FOR MOTOR VEHICLES
Filed April 23, 1958    2 Sheets-Sheet 2

INVENTOR.
MAURICE WALTER
BY
*Paul M. Phillips*
ATTORNEY

United States Patent Office 2,972,265
Patented Feb. 21, 1961

2,972,265

DIFFERENTIAL MECHANISM FOR MOTOR VEHICLES

Maurice Walter, 455 E. 51st St., New York, N.Y.

Filed Apr. 23, 1958, Ser. No. 730,385

4 Claims. (Cl. 74—711)

The present invention relates to a torque-proportioning differential mechanism for motor vehicles and more particularly to such a mechanism including provisions for preventing all the power applied to the differential mechanism from being transmitted to a driven shaft which is relatively free to move, so as to a substantial extent to equalize the speed of rotation of the two driven shafts, while permitting the necessary differential movement of these driven shafts incident to turning corners, etc.

The function of a differential in a motor vehicle is to provide rotation to two drive shafts and permit necessary difference in speed of rotation, for example, so as to accommodate the greater travel of an outside wheel when making turns.

Conventional bevel or spur gear differentials are essentially torque balancing, except for some friction. This means that all of the rotation goes to the side having the least resistance and that shaft is rotated at double speed, while the other stands still. Thus the sun gear on one shaft can stand still and the driven differential case rotation will cause the connecting gears to drive the other sun gear at double speed.

Many differential mechanisms have been proposed in the past, including the conventional one in which a rotating differential case is provided including gears carried by a pair of driven shafts and one or more satellite gears therebetween, the differential case being driven from a source of power, such as the propeller shaft of a motor vehicle, which is disposed axially thereof and is connected to the case of the differential through a pair of beveled gears.

Attempts have also been made to provide so-called "locking differentials," in which provision is made to prevent all the power from flowing to one wheel or driven shaft which is relatively free to rotate, and little or no power to the wheel or driven shaft having traction. Some of these so-called locking differentials are very large and cumbersome and not at all practical; while others utilize schemes involving end thrust of gears or shafts which is dissipatated in friction and often results in excessively rapid wear of some or all the parts.

The device of the present invention is designed to obtain the desirable results of some of the better prior art devices of the locking differential type, while being relatively free of the difficulties inherent therein, in that it is designed to occupy a relatively small space, so as to be used in motor vehicle drives without requiring unduly large differential housings. The present device is also so arranged that the cam-like gear teeth thereof, which will be described in more detail hereinafter, are relatively unbreakable, having root portions of great width with respect to conventional gear teeth. The present device further includes an arrangement of gears in which all the satellite gears rotate about axes parallel to the main driven gear axes associated with the differential. In this device a plurality of pairs of such satellite gears are provided, in each of these pairs, one satellite gear meshes with one of the principal or sun gears; while the other satellite gear of each pair meshes with the other principal or sun gear, the two satellite gears of each pair meshing with each other. While ordinary gear teeth disposed parallel to the axis of rotation of the gear are contemplated in accordance with the present invention, a preferred form thereof employs helically arranged teeth for all the gears.

With the cam-like gears of the present invention the radial component of contact pressure is greater than the tangential component, so that the sun gear on one side has less effective leverage to rotate the contacting satellite. Each satellite has less effective leverage to rotate the other contacting satellite of each pair thereof; and the other satellite of each pair has less effective leverage to rotate the other sun gear. For a given torque resistance on one side there is only a small proportion of torque transmitted to speed up the other side with respect to the housing. Therefore, both shafts are rotated; instead of one shaft standing still and the other rotated at double speed. The shaft which has the greater driving resistance receives proportionately greater driving torque than the other shaft which has less driving resistance. In other words, there is provided a locking differential having the desirable characteristics of the better of the prior art locking differentials, while avoiding much of the excessive wear characteristics incident to the use of many at least of the prior art differentials of the locking type.

The desirable features of the present invention are attained with a minimum number of parts and in a relatively simple manner, so that the device as a whole may be constructed and assembled at a minimum expense. The device is also rugged and of relatively small size considering the amount of power to be transmitted therethrough, so as to be particularly adaptable for use in heavy-duty vehicles.

Other and more detailed features of the present invention will become apparent from the following particular description of a preferred embodiment thereof as illustrated in the accompanying drawings, in which.

Figure 1:
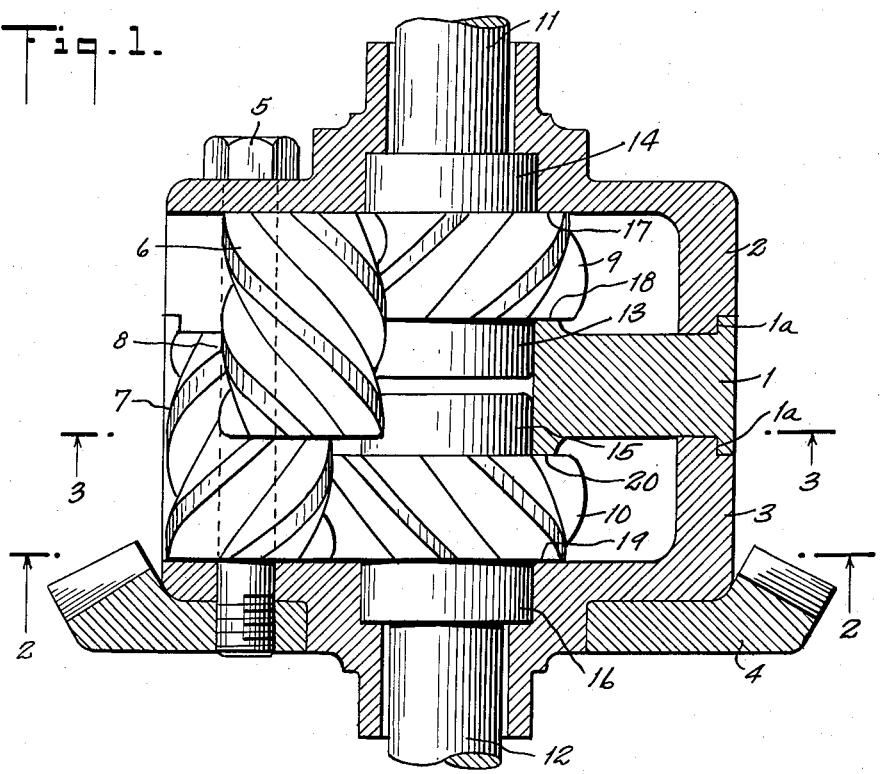
Fig. 1 is a view substantially in longitudinal central section of a differential mechanism according to the present invention, but with some parts omitted and others shown in elevation for convenience of illustration.

Turning now to the accompanying drawings as illustrative of a preferred form of the present invention, the device comprises a rotatable differential case which is preferably made up of a center spider 1, an end section 2 shown above the spider 1 in Fig. 1 and a substantially similar end section 3 shown below the spider in this figure. The end sections 2 and 3 have the usual hub portions which are arranged to be received in suitable bearings in a conventional manner. The end section 3 is further recessed for attachment to a ring gear 4, here shown as a beveled gear. It will be understood that the differential case and its ring gear 4 are all adapted to be rotated by power supplied from any suitable source, such as the engine of a motor vehicle (not shown) which is mechanically connected in an appropriate manner so as to drive the gear 4. The several portions of the differential case as previously described and the gear 4 are all held together by a plurality of bolts 5 having heads as shown bearing upon the end section 2 and having threaded portions engaging complementary threads in the end section 3 and/or in an inwardly directed flange portion of the gear 4. The center spider 1 has shoulders 1a that contain the end sections 2 and 3 to resist directly the radial forces imposed by the contact of the sun and satellite gears.

Figure 2:
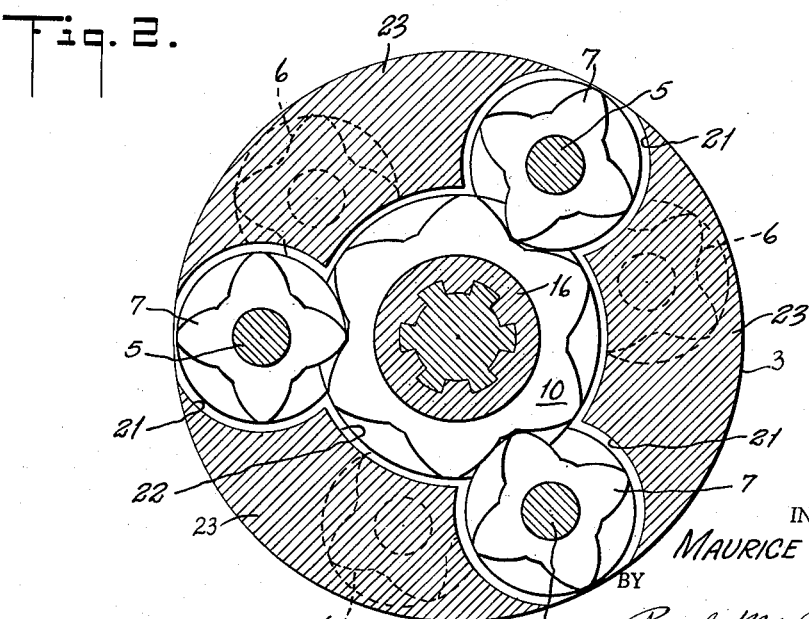
Fig. 2 is a transverse sectional view taken substantially on the line 2—2 of Fig. 1, but with the beveled gear for rotating the differential case omitted.
Figure 3:
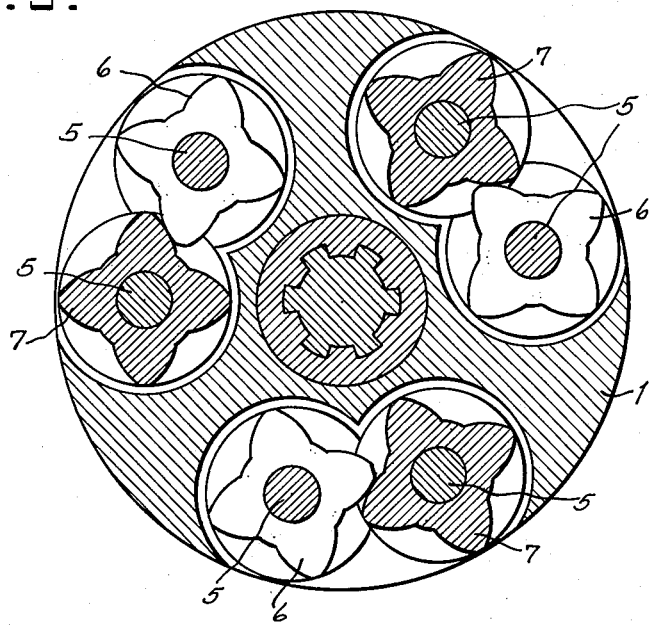
Fig. 3 is a view, substantially in transverse section on the line 3—3 of Fig. 1.

The arrangement shown in the accompanying drawings includes a plurality of pairs of satellite gears, each pair comprising a gear 6 and a gear 7, these gears meshing with one another at a center portion 8 substantially within the space cut out of the center spider 1 of the cage for the reception of the gears 6 and 7. As shown, the gear 6 also meshes with a principal or sun gear 9, i.e. the gear 6 has a portion meshing with the gear 9 and another portion meshing with the gear 7. Similarly, the gear 7 has a portion meshing with a sun gear 10 similar to the gear 9 and another portion meshing as shown at 8 with a portion of the gear 6. As seen in Figs. 2 and 3, there are three pairs of satellite gears, each pair including gears 6 and 7 and each pair being essentially similar to the others.

The sun gear 9 is suitably splined on or otherwise arranged non-rotatably to receive a shaft 11 which is arranged coaxially with the axis of rotation of the differential case; while the sun gear 10 is similarly splined on or otherwise arranged non-rotatably to receive a shaft 12; the shafts 11 and 12 being the driven shafts associated with the differential. These shafts may, for example, carry driving wheels (not shown).

As shown in Fig. 1, the sun gear 9 has a pair of annular extensions which are respectively received within bearings 13 and 14; while the sun gear 10 has similar extensions received within bearings 15 and 16. The shafts 11 and 12 are preferably arranged so that they are splined to or otherwise non-rotatably received in the gears 9 and 10 respectively and so that they may be withdrawn and replaced without dislodging the gear arrangements within the differential case.

As shown also in Fig. 1, the sun gear 9 is confined axially between a surface 17 of the inside of the end section 2 and an annular surface 18 formed on the center spider 1, so that any end thrust effective on the gear 9 may be transmitted directly to the differential case without substantial play or axial movement. Similarly, the sun gear 10 is confined axially between a surface 19 of the inside of the end section 3 and an annular surface 20 of the center spider 1. It will be understood that these axial confinements of the sun gears 9 and 10 are arranged to permit free rotation of the gears with respect to the differential case and any part thereof.

The satellite gears 6 and 7, the meshing of which has previously been described, are mounted for free rotation on the bolts 5 and are each preferably arranged to abut at each end against portions of the end sections 2 and 3 of the differential case. Thus substantial axial movement of the several satellite gears is prevented by their being axially confined as stated. For this purpose the end section 2, for example, extends substantially to the center spider 1, but is provided with substantially cylindrical cut-out portions or recesses for the satellite gears 6 and the sun gear 9. In like manner, the end section 3, as seen in Fig. 2, extends substantially to the center spider 1 and, like the end section 2, is provided with substantially cylindrical cut-out portions or recesses 21 for the satellite gears 7 and a larger cut-out portion 22 for the sun gear 10. The portions of the end section 3 between the cylindrical recesses 21 are shown at 23 and are extended so as to provide an end surface against which the gears 6 axially abut, it being understood that the center spider 1 is provided with suitable recesses as shown in Fig. 3 for receiving both the gears 6 and 7 of each of the three pairs and also for receiving the extensions 13 and 15 of the sun gears 9 and 10 respectively.

The present invention includes not only the arrangement of gears as previously described, but also a novel shape of the gear teeth as hereinafter set forth, the gear arrangement aforesaid cooperating with the shape of the teeth to produce the novel and desirable results of this invention. These gear teeth are in effect part way between conventional gear teeth on the one hand and cams on the other. For that reason the gears usable in accordance with the present invention may be termed "cam-like gears" in that each tooth is in effect shaped as a cam and is very wide at the root in its angular extent; while being so shaped that a pair of meshing teeth as seen, for example, in Fig. 2 and on an enlarged scale in Fig. 4 of the accompanying drawings is effective to transmit force from a driving to a driven gear (of any meshing pair of gears) in such a way that if this force were resolved into components, one radial of the driven gear and the other tangential thereof, the radial component would be the greater component. This results in applying an increased torque to the shaft having greater torque resistance.

Figure 4:
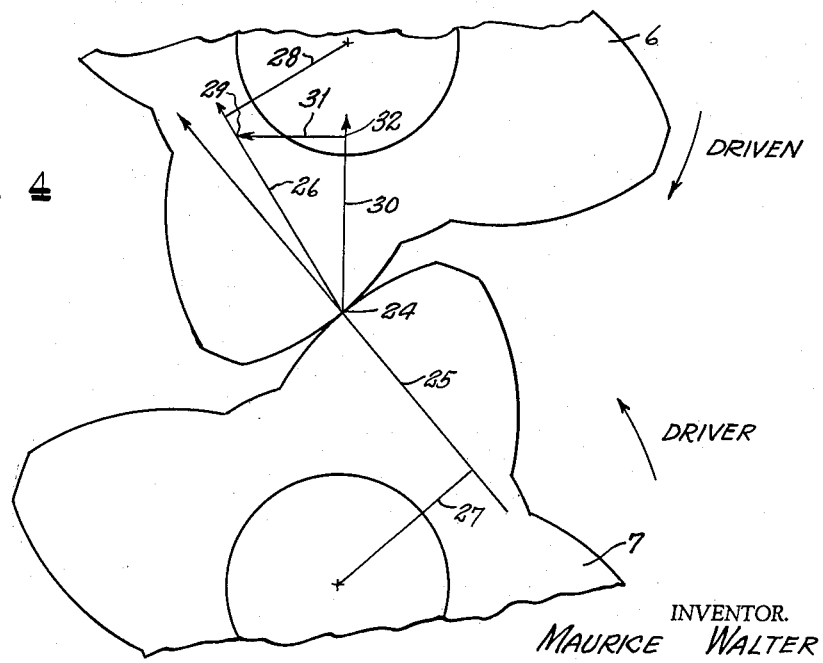
Fig. 4 is a fragmentary and substantially diagrammatic view of portions of two intermeshing cam-like gears, showing a resolution of the forces transmitted from one to the other.

Turning now to Fig. 4, there is shown portions of two cam-like gears, which are numbered 6 and 7 as these two gears shown in Fig. 4 may in fact be the gears 6 and 7 under certain circumstances. It is further assumed in Fig. 4 that the gear there numbered 7 is at the moment the driving gear and the gear there numbered 6 is the driven gear as force is being transmitted from one gear to the other. As shown, the gears are in contact with each other at a point 24.

As shown in Fig. 4, a line 25 is drawn perpendicular to a tangent to the gears 6 and 7 at the point of contact 24 of these gears. If there were no friction, force would be transmitted from the driving gear 7 to the driven gear 6 along this line 25. Due to the incidence of friction, however, the force applied to the driven 6 will be substantially in the direction of line 26, which passes through the point 24 and is disposed at an angle to the line 25 and is directed closer to the center of the gear 6 than is the line 25. The actual angle between the lines 25 and 26 depends upon the amount of friction. Thus, a perpendicular from the center of the gear 7 to the line 25, shown as the line 27, has a length which is a predetermined function of the pressure angle of the gears and is inversely proportional to the pressure angle. The distance from the line 26 to the center of the gear 6 will be a shorter distance (along a perpendicular line 28) than the length of the line 27. Thus, if torque of the gear 7 in driving the gear 6 were, for example, to be 100 units (as inch-pounds), the torque effective upon the gear 6 would be a substantially smaller value, possibly 63 inch-pounds on the same basis. These figures are not intended to be exactly proportionate to the dimensions on the drawings, but are in a reasonable order of relative magnitudes and given purely by way of example.

Considered from another point of view and assuming that the length of the line 26 from the point 24 to a point 29 is proportional to the force transmitted to the gear 6, this force may then be resolved into two components, one radial of the gear 6 and indicated by the line 30, and the other tangential of this gear and indicated by the line 31, the lines 30 and 31 being perpendicular to each other and the line 31 intersecting the line 30 at 32 and intersecting the line 26 at 29. It will be seen that the length of the line 30 from the point 24 to the point 32, which is proportional to the radial component, is far greater than the length of the line 31 from the point 32 to the point 29, which is the tangential component. Thus, under all circumstances, the force received by a driven gear may be considered as resolvable to a radial component and to a tangential component; and in each and every instance, the radial component will substantially exceed the tangential component.

The practical result of the gear arrangement here disclosed is that when force is transmitted through the beveled gear 4 to rotate the differential case as an entirety, and one of the two shafts 11 or 12 (assume the shaft 11) is free to rotate, while the other of these shafts (assume the shaft 12) is, for example, carrying a wheel having good traction, the shaft 11 would, in the case of a conventional differential gear, rotate at twice its normal speed while the shaft 12 would not rotate at all. In the present device the shaft 11 connected to the wheel having little or no traction would in fact not be rotated at a speed substantially faster than the differential case due to the gear arrangement herein set out. Thus, the device herein described will apply an increased amount of torque to the shaft 12 carrying the wheel having the greater traction, so as to drive this shaft and the wheel carried thereby. Similar action will ensue if the conditions are reversed and the shaft 11 carries a wheel having traction, while the shaft 12 carries a wheel having little or no traction. In either case, there will be an adequate drive to both shafts so that both will be rotated; while neither will be rotated at a speed substantially in excess of the speed of rotation of the differential case.

Furthermore, when all the cam-like gears are in effect spur-type gears, i.e. with their teeth extending parallel to their axes of rotation in each instance, there will be no force transmitted axially of any of the gears. It is recognized of course that when helical gears are used, there is inevitably some axial component of force transmitted from any driving gear to any driven gear and also a component of force effective on the driving gear in an axial direction opposite that of the axial force on the driven gear. Even here, however, the radial component of force transmitted to any driven gear will substantially exceed the tangential component thereof, i.e. tangential to the axis of rotation of a driven gear of any pair of intermeshing gears.

The description thus far given applies to the invention even when the teeth of each of the several gears extend parallel to the axis of rotation thereof. This is one embodiment of the invention which is considered desirable, although the preferred form thereof is one as shown in Figs. 1 to 3 of the accompanying drawings in which all the gears are helical. The use of helical gearing is considered desirable and is preferred in order that the mesh of the relatively few teeth of the gears provided shall be substantially continuous and the driving force at any given time shall be smooth and in effect be continuous. This result can be obtained by the use of gears having a relatively large number of teeth, which would practically require the use of larger gears; but when gears are used having relatively few teeth as shown in Fig. 2 of the accompanying drawings, the use of helical gears is preferred to assure a continuous and smooth flow of power at all relative positions of the intermeshing gears.

In the preferred embodiment of the invention using helical gears, one of the principal or sun gears 9 and 10 will be right hand, for example, gear 9, while the other, as gear 10, will be left hand. The same reverse relationship takes place in each pair of satellite gears, so that the gear 6 is shown left hand, while the gear 7 is right hand.

While there is herein shown and described but one principal embodiment of the invention and some alternative constructions have been suggested as the description proceeded, it is contemplated that other and further modifications will suggest themselves to those skilled in the art from the foregoing disclosure. I do not wish to be limited, therefore, except by the scope of the appended claims which are to be construed validly as broadly as the state of the prior art permits.

What is claimed is:

1. A torque-proportioning differential mechanism for use in motor vehicles, comprising a rotatable differential case, a gear carried by said case and adapted to be driven to rotate said case about a predetermined axis, a pair of shafts coaxial with said axis to which driving power is transmitted by said mechanism, a cam-like sun gear non-rotatably receiving each of said pair of shafts and located within said differential case, a plurality of pairs of satellite cam-like gears mounted in and for free rotation with respect to said differential case about axes parallel to the first-named axis, each of said cam-like sun gears meshing with a portion of a respective one only of each of said pairs of satellite cam-like gears respectively, and the satellite cam-like gears of each of said pairs thereof having other portions meshing with each other; and each of said cam-like sun gears and each of said satellite cam-like gears having cam-like teeth which are so shaped that force transmitted from any one of said cam-like gears to another thereof by the intermeshing of such cam-like gears will be exerted to a major extent radially of the driven cam-like gear in each instance and to a minor extent tangentially thereof, so as to apply greater torque to the shaft having greater torque resistance, all said cam-like teeth of each of said gears being of such shape that any one of said gears can act as a driving gear to transmit force effective to rotate any other of said gears meshing therewith.

2. A torque-proportioning differential mechanism in accordance with claim 1, in which said differential case comprises two end sections and a center spider, in which a plurality of bolts are provided, each bolt serving to hold said end sections and said center spider of said case together and also serving as a pintle for one of said satellite cam-like gears; and in which each of said sun gears is provided with two bearings, one of which is in said center spider and the other in the respectively associated end section of said differential case.

3. A torque-proportioning differential mechanism for use in motor vehicles, comprising a rotatable differential case, a gear carried by said case and adapted to be driven to rotate said case about a predetermined axis, a pair of shafts coaxial with said axis to which driving power is transmitted by said mechanism, a cam-like helical sun gear non-rotatably receiving each of said pair of shafts and located within said differential case, one of said helical sun gears being right hand and the other left hand, a plurality of pairs of satellite cam-like helical gears mounted in and for free rotation with respect to said differential case about axes parallel to the first-named axis, the satellite cam-like helical gears of each pair including one right hand and one left hand helical gear, each of said cam-like helical sun gears meshing with a portion of a respective one only of each of said pairs of satellite cam-like helical gears, and the satellite cam-like helical gears of each of said pairs thereof having other portions meshing with each other; and each of said cam-like helical sun gears and each of said satellite cam-like helical gears having cam-like teeth which are so shaped that force transmitted from any one of said cam-like helical gears to another such gear meshing therewith will be exerted to a major extent radially of the driven cam-like helical gear in each instance and to a minor extent tangentially thereof, so as to apply gerater torque to the shaft having greater torque resistance, all said cam-like teeth of each of said gears being of such shape that any one of said gears can act as a driving gear to transmit force effective to rotate any other of said gears meshing therewith.

4. A torque-proportioning differential mechanism in accordance with claim 3, in which said differential case comprises two end sections and a center spider; in which a plurality of bolts are provided, each bolt serving to hold said end sections and said center spider of said case together and also serving as a pintle for one of said satellite cam-like helical gears; in which each of said sun gears is provided with two bearings, one of which is in said center spider and the other in the respectively associated end section of said differential case; and in which each of said cam-like helical sun gears is confined axially between a part of the respectively associated end section of said case and a part of said center spider.

References Cited in the file of this patent

UNITED STATES PATENTS

| | | |
|---|---|---|
| 2,000,223 | Du Pras | May 7, 1935 |
| 2,178,613 | Seeck | Nov. 7, 1939 |
| 2,462,000 | Randall | Feb. 15, 1949 |
| 2,481,873 | Randall | Sept. 13, 1949 |
| 2,666,343 | Casa-Massa | Jan. 19, 1954 |

FOREIGN PATENTS

| | | |
|---|---|---|
| 27,123 | Great Britain | Apr. 25, 1912 |